Jan. 16, 1934.  C. A. BUTLER  1,943,581
VEHICLE BODY CONSTRUCTION
Filed March 26, 1930   2 Sheets-Sheet 2
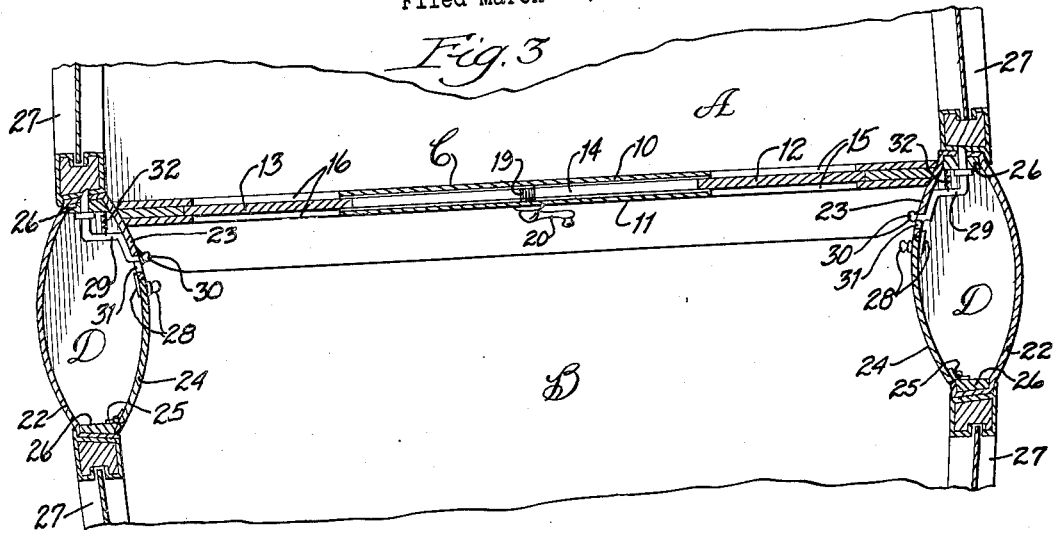
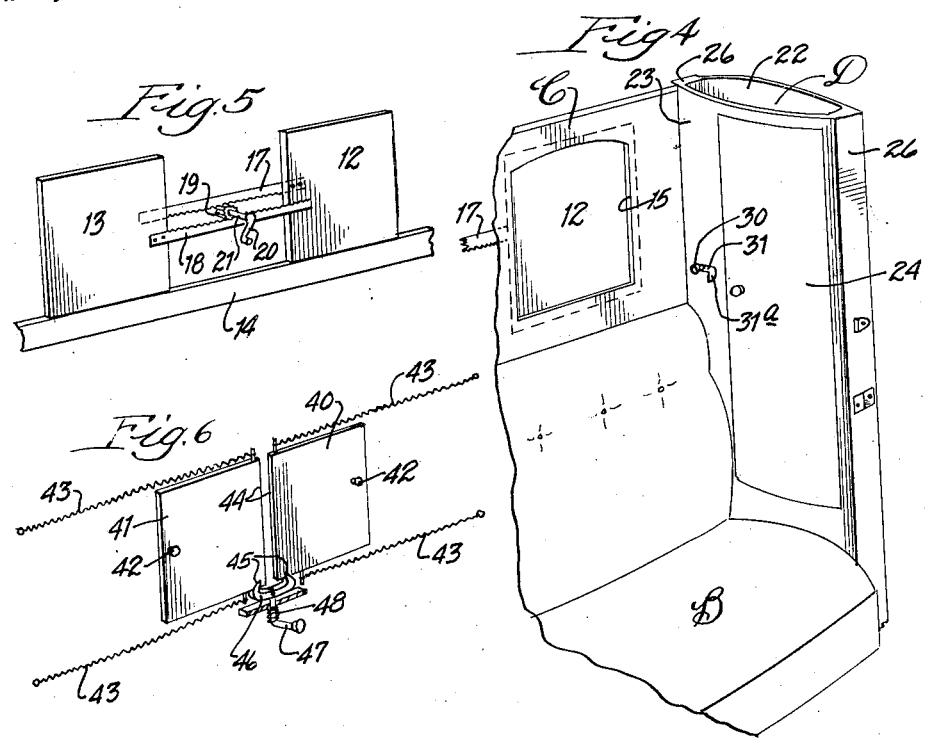
Inventor:
Cora A. Butler,
By Benning + Benning
Attys.

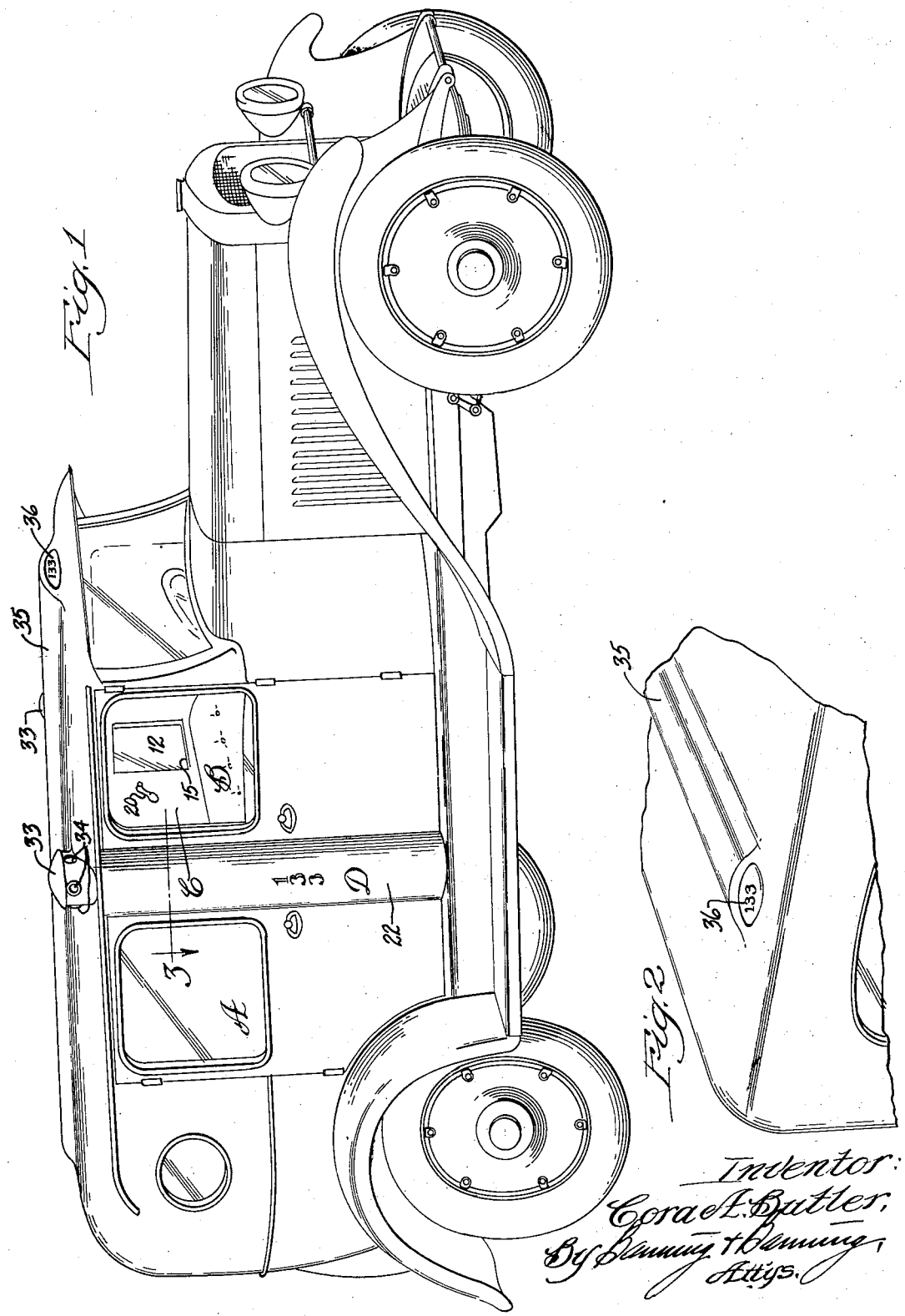

Patented Jan. 16, 1934

1,943,581

UNITED STATES PATENT OFFICE 1,943,581

VEHICLE BODY CONSTRUCTION

Cora A. Butler, Chicago, Ill.

Application March 26, 1930. Serial No. 438,954

4 Claims. (Cl. 296—44)

This invention relates to certain improvements in automobile bodies, and more particularly to taxicab bodies.

The primary object is to provide means for protecting taxicab drivers from holdup or injury by their passengers.

This and other objects, as will hereinafter appear, are accomplished by this invention which is fully described in the following specification and shown in the accompanying drawings, in which—

Figure 1 is a perspective view of a taxicab embodying my present invention;

Fig. 2 is a fragmentary perspective view of the top as viewed from the rear;

Fig. 3 is a horizontal sectional view taken as indicated by the line 3 of Fig. 1;

Fig. 4 is an interior perspective view of a portion of the driver's compartment.

Fig. 5 is a perspective view of the windows which close the opening between the passenger's compartment and the driver's compartment; and Fig. 6 is a view similar to Fig. 5 showing a modified form of window.

My invention comprises in its preferred embodiment, a rear or passenger's compartment A, a front or driver's compartment B, and a partition C separating the two compartments. Adjacent the driver's seat and extending vertically from the frame of the car to the top may be formed suitable enclosures D, in which the driver may keep extra wearing apparel and the like.

The partition C preferably consists of a double wall of suitable bullet-proof material, such as steel, the walls being in spaced relation and designated as 10 and 11. Slidably mounted between these walls are windows 12 and 13, preferably of bullet-proof glass or steel, supported on a suitable guide 14, and which are adapted to close the openings 15 and 16 between the compartments A and B. Means for operating the doors may consist of racks 17 and 18 securely mounted on the windows 12 and 13 respectively, and having the teeth of each rack facing each other. Interposed between the racks, and meshing therewith, may be rotatably mounted a gear 19 connected to an operating handle 20, in the compartment B, through a shaft 21. It will be seen that by turning the gear 19, by the handle 20, the windows will be moved to closed or open position simultaneously.

A lock bolt 29 may be mounted in the posts 26 for securing the doors 27 of the compartment A when it is desired to lock the passenger in the rear compartment A. The bolt may terminate in a knob 30 extending through an L-shaped slot 31 in the wall 23. It will be seen that the lock bolt 29 is operated independently of the usual door latch and cannot be operated from the compartment A. A spring 32 normally tends to keep the lock bolt in locked position, but it is normally held in a retracted position by the offset position 31$^a$ of the slot 31.

Fig. 6 shows a modified form of window enclosed in the partition C for closing the openings 15 and 16, which comprises a pair of complementary windows 40 and 41 having operating handles 42 which extend into the compartment B. Long coil springs 43 may be secured at one end to the interior and near the extreme edge of the partition C, the other ends being attached in a suitable manner to the windows 40 and 41 on their upper and lower edges, and preferably near the inner edge 44 of the window. That is, the springs would extend along the upper and lower edges of the window, which slides between suitable guides, not shown.

Notches 45 are provided in the lower edge of the windows and near the edge 44 to accommodate a latch member 46, which is connected to a handle 47 extending into the compartment B. A spring 48 normally tends to hold the latch in contact with the notches 45. To open the windows the driver in compartment B pushes the window by the handle 42 to open position against the tension of the spring 43 until the notch 45 engages the latch 46, where it is held in open position. To close the window the operator pulls down on the handle 47 which disengages the latch 46 from the notch 45, and the springs pull the window to closed position.

Thus it will be seen that the taxicab driver may protect himself against a passenger whom he suspects of having intentions of holding him up, or otherwise mistreating him, by closing the opening between the two compartments A and B, and by releasing the knobs 30, thereby locking the doors of compartment A so that the passenger cannot escape, and may, if the driver so desires, be taken and turned over to a police officer.

The enclosures D may consist of an outwardly bowed wall 22, a partial inwardly bowed wall 23, and a door 24 curved to complete the inner wall of the compartment, and which may be hinged, as at 25, to upright posts 26 which form the framework surrounding the openings for the doors 27. Suitable latching means 28 secures the door 24 in closed position.

The body of the taxicab may be of the usual conventional design, and in addition I have provided a dome 33 on each side of the car. Each dome has a series of lights 34 for lighting the side of the car to assist in locating the running board. These lights may be lit continuously, or may be operated by a switch (not shown) from the doors 27 so that they light upon the opening of any one of the doors.

I further provide a streamline rib 35 extending longitudinally along the top of the car, and substantially in its center. At each end of the rib I provide a non-removable glass covered window 36 having indicia thereon to identify the taxicab, and having a light (not shown) mounted behind the glass 36 to display the indicia at night.

While I have shown and described but a few embodiments of my invention, it is to be understood that it is capable of many modifications. Changes, therefore, in the construction may be made which do not depart from the spirit and scope of the invention as disclosed in the appended claims.

I claim:

1. In a vehicle body, a partition comprising two panels in spaced relation, the panels having aligned openings therein, the partition dividing the body into front and rear compartments, windows having notches in one edge slidably mounted between the panels and adapted to open or close the openings, spring means attached to the windows tending to keep them in closed position, a spring-pressed latch adapted to engage the notches in the windows and hold them in open position, and means extending from the latch into the front compartment for releasing the latch from the windows.

2. In a vehicle body, two compartments separated by a partition having an opening, a window movable to cover and uncover said opening, yieldable means normally tending to force said window to closed position, latch means for retaining the window in open position, and means for releasing said latch to permit the yieldable means to force the window to closed position.

3. In a vehicle body, two compartments separated by a partition having an opening, a window movable to cover and uncover said opening, yieldable means normally tending to force said window to closed position, latch means for retaining the window in open position, and means operable from one compartment only for releasing said latch to permit the yieldable means to force the window to closed position whereby the opening between the compartments is controlled solely from the first mentioned compartment.

4. In a vehicle body, two compartments separated by a partition having an opening, a window movable to cover and uncover said opening, yieldable means normally tending to force said window to closed position, latch means for retaining the window in open position, and means operable from the front compartment only for releasing said latch to permit the yieldable means to force the window to closed position whereby the opening between the compartments is controlled solely from the front compartment.

CORA A. BUTLER.